Patented Dec. 25, 1934

1,985,231

UNITED STATES PATENT OFFICE 1,985,231

MANUFACTURE OF VULCANIZED HEAT-BODIED FATTY OILS

László Auer, Budapest, Hungary, assignor to J. Randolph Newman, Washington, D. C., as trustee No Drawing. Application April 26, 1928, Serial No. 273,160. Renewed March 22, 1934

8 Claims. (Cl. 106—23)

This invention relates to the manufacture of vulcanized, heat-bodied oil products from fatty oils and the like, and it comprises methods of making such oil products wherein a fatty oil is first heat-bodied by heating to temperatures sufficient to thicken and body the oil until the oil is substantially thickened and bodied and has modified physical properties, and then the heat-bodied oil product thus obtained is vulcanized with sulphur, sulphur chloride, etc., to further modify its properties, the heat-bodying may be advantageously effected in the presence of basic substances facilitating the bodying of the oil, such as metals, metal oxides, metal hydroxides or organic bases, the fatty oil being mixed with such basic modifying agent and the mixture heated to the required temperatures; and it also comprises the new vulcanized modified heat-bodied oil products so obtained, all as more fully hereinafter described and claimed.

In the art, heat-bodied fatty oils are well-known. They are obtained by heating linseed oil and other fatty oils to 200° C. or above, preferably under vacuum, that is reduced pressure, until the oil is thickened and bodied. These heat-bodied oils have a characteristic internal structure and other properties. Polymerized linseed oil (linseed oil stand oil) is representative of this distinctive commercial class of bodied oil products. Generally they are known as polymerized oils or stand oils. The heat-bodied oils are very much more viscous than the raw oil and may be semi-solid or solid at room temperatures. They are thermoplastic becoming softened, and in some cases even liquid, when heated to elevated temperatures.

Also bodied oil products, useful in the manufacture of linoleum, have been obtained by heating a fatty oil e. g. linseed oil, to polymerizing temperatures in the presence of and with the aid of certain metals. (See German Patents Nos. 201,966; 258,900; and 276,363.) Those heat-bodied, modified oil products are also thermoplastic and soften upon heating to relatively low temperatures.

For some purposes this thermoplasticity of the heat-bodied oil products is advantageous. But for certain other uses this softening or melting upon heating to comparatively low temperatures is an unpleasant quality and undesirable.

I have found that improved products may be obtained by vulcanizing those heat-bodied oil products with sulphur or sulphur chloride. The vulcanized heat-bodied oil products have a much higher softening point, and the other properties are also modified. Thus my subsequent vulcanization eliminates an undesired property from the heat-bodied oil. My invention, thus viewed, is an improvement in making heat-bodied oil products, part of the bodying being a heat-bodying supplemented with a further bodying obtained by vulcanization.

One object of this invention is to manufacture new and useful artificial products from fatty oils and other substances containing unsaturated carbon compounds. I obtain the said new products by taking those substances which have been previously treated with basic modifying agents, such as metals, metal oxides, metal hydroxides and organic bases, to modify their viscosity, melting point and other properties, and afterwards treating the so modified material with a substance capable of supplying sulphur to those materials, such as sulphur, sulphur chloride and like sulphur compounds. From the standpoint of this invention, metals can be regarded as basic modifying agents, as they react in the reaction like bases. But in using metals as the modifying agent, hydrogen is developed during the reaction.

For instance, when linseed oil is heated in known manner with metallic magnesium or metallic iron (ferrum hydrogenic reductum) modified products are obtained which tend to melt or soften at comparatively low temperature. I have found that if the modified linseed oil products so obtained, are afterwards subjected to a sulphurization (vulcanization), harder products having greater resistance to melting are obtained. I have further found that new, improved and advantageous products may be obtained from other starting materials, such as castor oil.

In practicing my processes, using these modifying agents, the starting substance, such as linseed oil, castor oil, etc., is first treated with the basic modifying agent to produce a modified body and then the modified product so obtained is vulcanized. As stated metals, metal oxides, metal hydroxides and organic bases may be used as the basic modifying agent. The vulcanization is effected by means of sulphur or sulphur chloride in the usual manner.

In the sulphurization a solvent may be used. For instance, white spirit may be used with sulphur chloride and carbon disulphide with sulphur.

Since during the sulphurization treatment gases may be evolved, it is best performed in molds under pressure.

The vulcanization may be accelerated by the addition of small quantities of vulcanization accelerators such as are used with rubber, for instance, hexamethylenetetramine, aniline, diphenylguanidine and the like.

Fatty oils and other natural or industrial products containing unsaturated carbon compounds which are liquid at ordinary room temperature or which melt or soften under the action of heat may be used as the starting material.

For the production of plastic materials, filler may be added to the reaction mass in addition to the reagents mentioned.

In my co-pending applications, Ser. Nos. 143,786 and 359,425, I have described and claimed methods of producing modified, heat-bodied oil products by heat-bodying fatty oils and the like in the presence of electrolytes, polar compounds, such as metal salts, etc., wherein a mixture of fatty oil and the modifying agent is heated to 200° C. or above until the modified, heat-bodied oil products are obtained. Those modified, heat-bodied oil products may be vulcanized as disclosed in those applications.

Generically my present invention comprises a two step method of making vulcanized oil products wherein the oil is first heat-bodied and modified and then vulcanized. The heat-bodied oil product is more adaptable to vulcanization with sulphur by the procedures ordinarily used with rubber than is the raw oil. Thus viewed, my present invention is an improvement in vulcanizing fatty oils wherein the oil is preliminarily heat-bodied prior to vulcanization; the bodying required of vulcanization being reduced by that secured by heat-bodying.

In these two step processes, the preliminary heat-bodying may be by old, well-known methods or by new methods discovered and developed by me and described in my other applications. In this application, processes using theretofore known methods of heat-bodying are disclosed.

In another co-pending application, Ser. No. 359,427, I disclose and claim other two step methods discovered and developed by me, wherein the preliminary heat-bodying is effected in the presence of alkali metals and their oxides and hydroxides.

In the present specification and claims, by the term "modified bodies" I mean the heat-bodied oil products described ante and by the term "modifying agent" I mean basic substances capable of facilitating the heat-bodying of the fatty oil when heated to polymerizing temperatures in the presence of said basic modifying agent.

My invention is illustrated but not limited by the following example in which the parts are parts by weight:—

*Example.*—200 parts of castor oil are boiled together with 4 parts of metallic calcium under reduced pressure until the metal is quite dissolved and the evolution of hydrogen has ceased. After cooling, the reaction mass is heated to 140° and is mixed with 200 parts of iron oxide (filler), 4 parts of aniline (accelerator) and 25 parts of sulphur. The whole is heated to 160° C. for ½ hour after which the product is formed into molds and pressed.

It may be stated that for success in the process the temperature of the initial treatment with a modifying agent should exceed 200° C.

What I claim and desire to secure by Letters Patent is:

1. In the manufacture of vulcanized and modified bodies from fatty oils, the process which comprises mixing a fatty oil with a basic modifying agent, heating the mixture until the fatty oil is substantially modified, the said heating being effected under reduced pressure, and then vulcanizing the modified body thus produced to obtain a vulcanized and modified body.

2. The process of claim 1 in which the fatty oil is castor oil.

3. The process of claim 1 in which the basic modifying agent is metallic calcium.

4. The process of claim 1 in which the vulcanization is effected by means of sulphur.

5. In the manufacture of vulcanized and modified bodies from castor oil, the process which comprises mixing castor oil with metallic calcium, heating the mixture until a modified body is obtained, the said heating being effected under reduced pressure, mixing the modified body thus produced with sulphur, iron oxide and aniline, and heating the vulcanized mixture to a temperature about 140° C. to produce a vulcanized and modified body.

6. In the manufacture of vulcanized, modified, heat-bodied oil products from fatty oils, the process which comprises mixing a fatty oil with a basic modifying agent capable of facilitating the heat-bodying of said fatty oil, heating the mixture to temperature sufficient to heat-body and modify the oil until the said modifying agent is dispersed in the oil and continuing the heating until a modified heat-bodied oil product is obtained, said heating being under non-oxidizing conditions, and then vulcanizing the modified heat-bodied oil product thus obtained to further modify the properties thereof.

7. The process of claim 6 wherein said modifying agent is metallic calcium.

8. In the manufacture of vulcanized, non-oxidized, heat-bodied oil products from fatty oils, the process which comprises heating a fatty oil under non-oxidizing conditions to temperatures sufficient to thicken and heat-body the oil until a non-oxidized, heat-bodied oil product is obtained and then mixing the heat-bodied oil product so obtained with sulphur and vulcanizing the mixture.

LÁSZLÓ AUER.